United States Patent [19]

Peters

[11] Patent Number: 4,612,361

[45] Date of Patent: Sep. 16, 1986

[54] POLY(ETHERIMIDES) AND COMPOSITIONS CONTAINING THE SAME

[75] Inventor: Edward N. Peters, Lenox, Mass.

[73] Assignee: General Electric Company, Pittsfield, Mass.

[21] Appl. No.: 779,253

[22] Filed: Sep. 23, 1985

[51] Int. Cl.[4] .............................................. C08G 73/10
[52] U.S. Cl. .................................. 528/185; 524/600; 528/26; 528/125; 528/128; 528/172; 528/188
[58] Field of Search ............... 528/185, 188, 353, 172, 528/26, 125, 128; 524/600

[56] References Cited

U.S. PATENT DOCUMENTS

| | | | |
|---|---|---|---|
| 3,356,648 | 12/1967 | Rogers | 528/353 |
| 3,424,718 | 1/1969 | Angelo | 528/188 |
| 3,649,601 | 4/1972 | Critchley | 528/353 |
| 3,847,867 | 11/1974 | Heath et al. | 528/185 |
| 3,959,350 | 5/1976 | Rogers | 528/185 |
| 3,983,093 | 9/1976 | Williams, III et al. | 528/185 |
| 4,196,277 | 4/1980 | Jones et al. | 528/185 |
| 4,197,396 | 4/1980 | Banucci et al. | 528/185 |
| 4,281,100 | 7/1981 | Takekushi | 528/185 |
| 4,429,102 | 1/1984 | Evans et al. | 528/185 |
| 4,504,605 | 3/1985 | Cooper | 528/185 |
| 4,540,748 | 9/1985 | Matzner et al. | 528/185 |

OTHER PUBLICATIONS

C.A. 62:14585 (1965), Diarylfluoro Compounds.

Primary Examiner—Lester L. Lee
Attorney, Agent, or Firm—Hedman, Gibson, Costigan & Hoare

[57] ABSTRACT

Novel fluoro-containing polyetherimides are prepared from bis ether dianhydrides, fluoro-containing dianhydrides, and organic diamines. The compolymers exhibit both increased Tg and increased solubility in halogenated solvents which enhances their value in a wide variety of uses including films, molding compounds, and coatings.

10 Claims, No Drawings

POLY(ETHERIMIDES) AND COMPOSITIONS CONTAINING THE SAME

This invention is concerned with a new class of polyetherimides. More particularly, the invention is concerned with polyetherimides derived from the reaction of an organic diamine, a bisphenol dianhydride and a fluoro-containing dianhydride.

BACKGROUND OF THE INVENTION

Polyetherimides are a family of thermoplastic resin compositions with important uses. Their preparation from arylene ether dianhydrides and diamines is described in Heath and Wirth, U.S. Pat. No. 3,847,867. Such materials modified by way of partially substituting dianhydrides of other types, e.g., pyromellitic-, diphenylsulfone- and benzophenone-dianhydrides, is also known from Williams III et al., U.S. Pat. No. 3,983,093. These modifications are reported to improve solvent resistance, thereby increasing the value of the resins in a wide variety of uses, including films, molding compounds and coatings. In any event, however, all such polyimides tend to have low solubility in halogenated solvents. There is a need to provide polyetherimide resin coating compositions with higher solids content in halogenated solvents. In addition, it would be desirable to enhance heat resistance as measured by thermal analysis and reported as glass transition temperature, Tg. It is also known to form polyimides, which are not polyetherimides, by reacting a fluorine analog of aromatic tetracarboxylic dianhydrides with diamines: Angelo, U.S. Pat. No. 3,424,718. In such polymers, pyromellitic dianhydride is replaced in part by fluoro-containing dianhydride, but there is no hint or suggestion that any such substitution into polyetherimides will enhance the solubility of the latter, especially in halogenated hydrocarbons, or elevate their Tg's.

It has now been surprisingly discovered, and is the subject matter of this invention, that the fluorocontaining dianhydride can replace a significant part of the bis ether anhydride in polyetherimides of the prior art and improve heat resistance. It is further surprisingly found that solubility in halogenated solvents is enhanced. Such copolymers have numerous uses as will be shown, with special utility in the field of coatings by deposition from solids.

SUMMARY OF THE INVENTION

According to the invention there are provided polyetherimides of the following formula $$[A]_m[B]_{1-m} \qquad I$$

where m is a number greater than 0 and smaller than 1, where A units are of the formula:

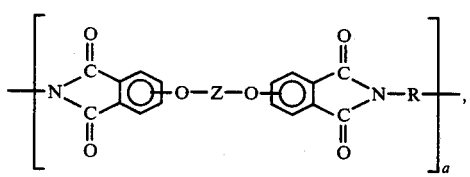

II.

where —O—Z—O— is in the 3 or 3'- and 4 or 4'- positions and Z is a member of the class consisting of (1)

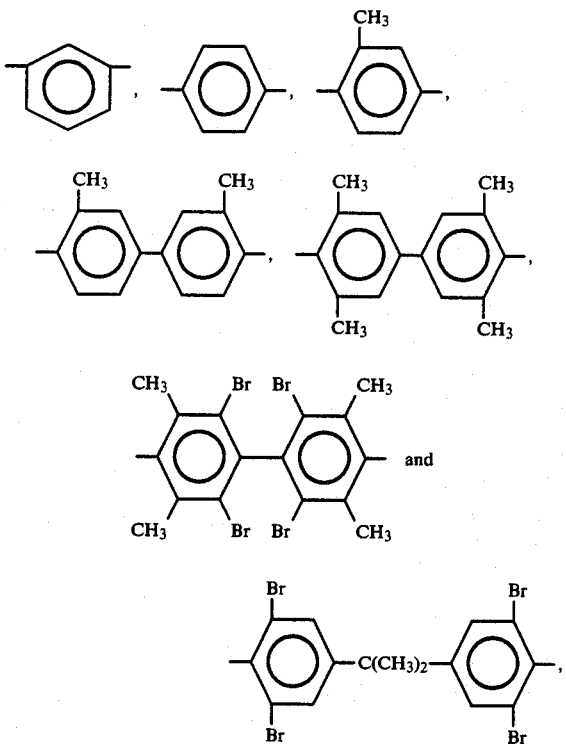

and (2) divalent organic radicals of the general formula:

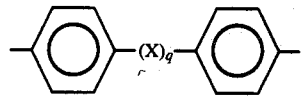

where X is a member selected from the class consisting of divalent radicals of the formulas, $C_yH_{2y}$,

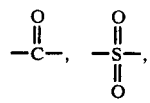

—O— and —S—, where q is 0 or 1, y is a whole number from 1 to 5, R is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, $C_{(2-x)}$ alkylene terminated polydiorganosiloxane, and (c) divalent radicals included by the formula

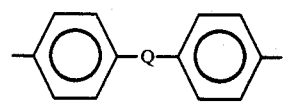

where Q is a member selected from the class consisting of —O—,

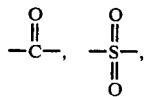

—S—, and —$C_xH_{2x}$—, and x is a whole number from 1 to 5 inclusive, and where the B units are of the formula:

III.

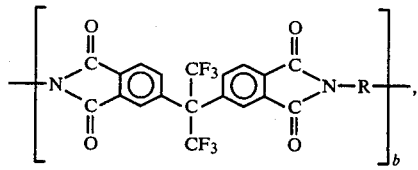

where R is a divalent organic radical as previously defined, and independently a and b represent a whole number in excess of 1.

Preferably A is of the formula

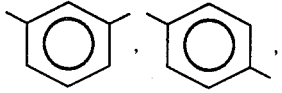

and R is a divalent organic radical as defined therein.

Especially preferably, both in A and B, R is

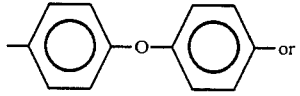

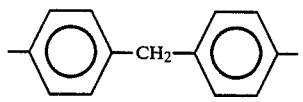

The invention also contemplates compositions adapted for use as coating compositions comprising a solution of (i) a polyetherimide as defined in claim 1, and, as a solvent therefor,
(ii) a normally liquid halogenated organic medium.

DETAILED DESCRIPTION OF THE INVENTION

The predominant proportion of the polyetherimide principal polymer chain comprises structural units of the empirical formula:

$[A]_m[B]_{1-m}$ where the mole fraction m stands for a number greater than 0 and smaller than 1, preferably a number at least greater than about 0.25, more preferably greater than about 0.50, and even more preferably greater than about The A units comprise the formula:

IV.

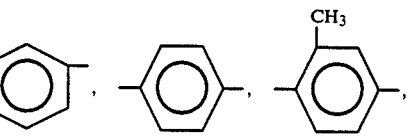

where —O—Z—O— is in the 3 or 3'— and 4 or 4'— positions and Z is a member of the class consisting of (1)

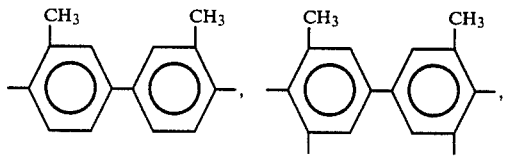

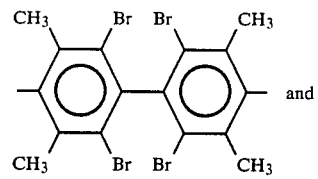

and

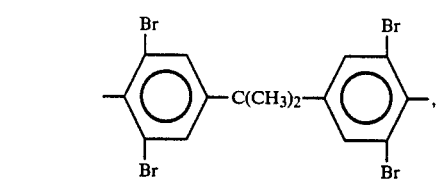

and (2) divalent organic radicals of the general formula:

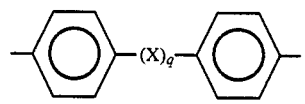

where X is a member selected from the class consisting of divalent radicals of the formulas, $C_yH_{2y}$, xylene (Dean-Stark trap) to give F6DA. The material can be obtained commercially from Hoechst, U.S.A.

The polyetherimides of Formula I can be obtained by reacting any dianhydride of Formula V, and the dianhydride of Formula VI, with a diamino compound of the formula $$H_2N-R-NH_2 \qquad \text{VII}$$

where R is as defined hereinbefore by any method well known to those skilled in the art.

In the above diamino compound, R is a divalent organic radical selected from the class consisting of (a) aromatic hydrocarbon radicals having from 6 to 20 carbon atoms and halogenated derivatives thereof, (b) alkylene radicals, and cycloalkylene radicals having from 2–20 carbon atoms, $C_{(2-x)}$ alkylene terminated polydiorganosiloxanes, and (c) a divalent radical included by the formula

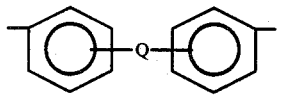

where Q is a member selected from the class consisting of —O—,

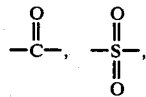

—S—, —C$_2$H$_{2x}$—, and x is a whole number of from 1 to 5, inclusive. Included among the organic diamines of Formula VII are, for example,
m-phenylenediamine,
p-phenylenediamine,
4,4'-diaminodiphenylpropane,
4,4'-diaminodiphenylmethane, benzidine,
4,4'-diaminodiphenyl sulfide,
4,4'-diaminodiphenyl sulfone,
4,4'-diaminodiphenyl ether,
1,5-diaminonaphthalene,
3,3'-dimethylbenzidine,
3,3'-dimethoxybenzidine,
2,4-bis(beta-amino-t-butyl)toluene,
bis(p-beta-amino-t-butylphenyl)ether,
bis(p beta-methyl-o-aminopentyl)benzine,
1,3-diamino-4-isopropylbenzene,
1,2-bis(3-aminopropoxy)ethane,
m-xylylenediamine,
p-xylylenediamine,
2,4-diaminotoluene,
2,6-diaminotoluene,
bis(4-aminocyclohexyl)methane,
3-methylheptamethylenediamine,
4,4-dimethylheptamethylenediamine,
2,11-dodecanediamine,
2,2-dimethylpropylenediamine,
octamethylenediamine,
3-methoxyhexamethylenediamine,
2,5-dimethylhexamethylenediamine,
2,5-dimethylheptamethylenediamine,
3-methylheptamethylenediamine,
5-methylnonamethylenediamine,
1,4-cyclohexanediamine,
1,12-octadecanediamine,
bis(3-aminopropyl)sulfide,
N-methyl-bis(3-aminopropyl)amine,
hexamethylenediamine,
heptamethylenediamine,
nonamethylenediamine,
decamethylenediamine,
bis(3-aminopropyl)tetramethyldisiloxane,
bis(4-aminobutyl)tetramethyldisiloxane, etc.,
and mixtures of such diamines.

The reaction can be advantageously carried out employing well known solvents, e.g., o-dichlorobenzene, m-cresol/toluene, etc., in which to effect interaction between the dianhydrides and the diamines, at temperatures of from about 100° to about 250° C. Aternatively, the polyetherimides can be prepared by melt polymerization where the dianhydrides of Formulas V and VI are reacted with any diamino compound of Formula VII while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerization can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal groups. The polyetherimides are injection moldable and can be reinforced by fillers, such as silica, carbon fibers, glass fibers, etc., in which the filler comprises on a weight basis from 20 to 200 parts of filler per 100 parts of polymer.

DESCRIPTION OF THE PREFERRED EMBODIMENTS

The following examples illustrate the present invention, but are not intended to limit it in any manner whatsoever.

EXAMPLE 1

The following rectants and solvents were added to a reactant vessel: 12.49 grams (0.024 moles) 2,2-bis-[4-(2,3-dicarboxyphenoxy) phenyl]propane dianhydride, hereinafter referred to as bisphenol-A dianhydride (BPA DA), 5.33 grams (0.012 mole) 2,2-bis(3',4'-dicarboxyphenyl) hexafluoropropane dianhydride (F6DA), 3.89 grams (0.036 mole) m-phenylenediamine, 0.08 grams (0.00054 mole) of phthalic anhydride, 100 g. of m-cresol and 100 ml. of toluene. The reaction mixture was heated at 150° C. for about 4 hours with the azeotropic removal of water. Then the temperature was raised to 180° C. for 1 hour. The resulting viscous solution was cooled and the polyetherimide was precipitated by pouring into methanol. The precipitate was dried at 180° C. under vacuum to give a polyetherimide containing structuring units A and B, respectively, of the formula

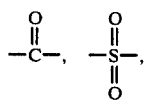

—O— and —S—, where q is 0 or 1, y is a whole number from 1 to 5, the divalent bonds of the —O—Z—O— radical are situated on the phthalic anhydride end groups, e.g., in the 3,3'-, 3,4'-, 4,3'- or the 4,4'-positions, and R is a divalent organic radical selected from the class consisting of (a) aromatic hydrocarbon radicals having from 6-20 carbon atoms and halogenated derivatives thereof, (b) alkylene radicals and cycloalkylene radicals having from 2-20 carbon atoms, $C_{(2-x)}$ alkylene terminated polydiorganosiloxane, and (c) divalent radicals included by the formula

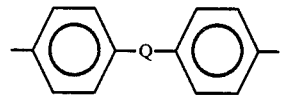

where Q is a member selected from the class consisting of —O—,

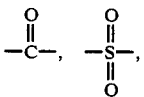

—S—, and —$C_xH_{2x}$—, and x is a whole number from 1 to 5 inclusive, and where the B units comprise the formula:

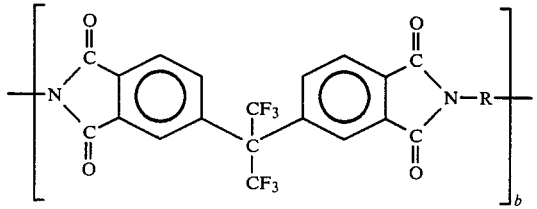

where R is a divalent organic radical as previously defined, and independently a and b represent a whole number in excess of 1, e.g., 10 to 10,000 or more.

Generally useful high molecular weight polyetherimides, hereinafter sometimes referred to as PEI, of Formula II have an intrinsic viscosity [∇] greater than 0.2 dl./gm., preferably in the 0.4 to 0.7 dl./gm. range or even higher, in phenol/trichloroethane at 25° C. The polyetherimide A units of Formula II and the polyimide B units of Formula III are combinable with each other in all proportions. Consequently, PEI compositions comprising from 1 to 99% A units, by weight, and from 99 to 1% B units, by weight, are included within the scope of the invention. By controlling the proportions of PEI-A units and PI-B units solvent resistant polyetherimides of Formula I can be prepared having predetermined properties which are improved over those of polyetherimides of Formula II free of polyimide units of Formula III. In general, the above-described polyetherimides can be made directly from the reaction of dianhydrides, for example, the dianhydride of formula

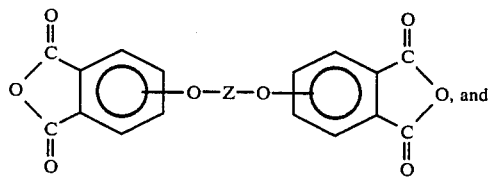

a dianhydride of formula

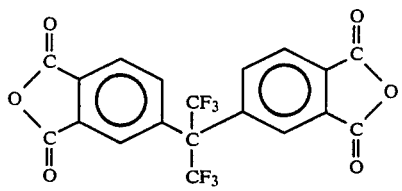

The bis ether anhydrides used to prepare the polyetherimides of this invention are known or can be readily prepared by those skilled in this art. See, for example, Heath, et al., U.S. Pat. No. 3,847,867. In general, the disodium salt of a dihydric phenol is reacted with a haloarylanhydride under condition wherein the C-O-C bond is formed.

Aromatic bis(ether anhydride)s include, for example, 2,2-bis[4-(2,3-dicarboxyphenoxy)phenyl]-propane dianhydride; 4,4'-bis(2,3-dicarboxyphenoxy)diphenyl ether dianhydride; 1,3-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy)diphenyl sulfone dianhydride 2,2-bis[4-(3,4-dicarboxyphenoxy) phenyl]propane dianhydride; 4,4'-bis(3,4-dicarboxyphenoxy) diphenyl ether dianhydride; 4,4'-bis(3,4-dicarboxyphenoxy) diphenyl sulfide dianhydride; 1,3-bis(3,4-dicarboxyphenoxy)benzene dianhydride; 1,4-bis(3,4-dicarboxyphenoxy) benzophenone dianhydride; 4-(2,3-dicarboxyphenoxy)-4,(3,4-dicarboxyphenoxy)diphenyl -2,2-propane dianhydride; etc. and mixtures of dianhydrides.

The 2,2-bis(3', 4'-dicarboxyphenyl)hexafluoropropane dianhydride (F6DA) is a known compound reported to be useful in making pyromellitic dianhydride based copolymers. See, for example, U.S. Pat. No. 3,424,718 (Example 5). The F6DA can be made by those skilled in the art following reported procedures, e.g., those of Netherlands patent application No. 6,406,896 (published Dec. 18, 1964 (CA 62:145856 (1965)). In one manner of proceeding, a mixture of $CO(CF_2Cl)_2$, toluene and HF is heated and then cooled. The product is treated with $CrO_3$ in AcOH, and $H_2O$ is added. This mixture is distilled with steam, filtered, and the resulting solid is dissolved in $Na_2CO_3$ solution then filtered again and acidified with $H_2SO_4$. $HCONMe_2$ is added to this crude diacid in $SOCl_2$. After reflux, the $SOCl_2$ is removed and the mixture is hydrolyzed with dilute aqueous MeOH-NaOH. $NH_3$ is added to this product in $H_2SO_4$ and $CHCl_3$, and after reflux and $H_2O$ filtration, the mixture is made alkaline with NaOH. Acetylation in AcOH with $Ac_2O$ is followed by addition of $H_2SO_4$ in $HNO_3$. This product is dissolved in $H_2SO_4$, and $H_2O$ is added until turbidity. The mixture is refluxed, then oxidized with $KMnO_4$ in $C_5H_5N-H_2O$ yielding a mixture which is dehydrated by boiling with

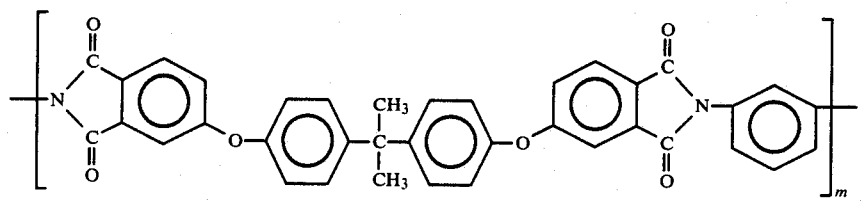

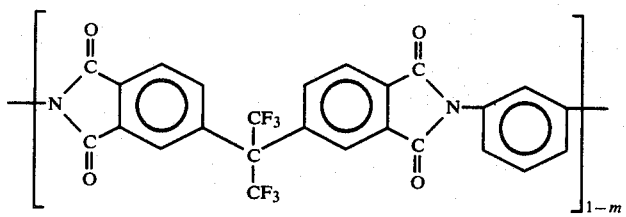

where m is a number equal to about 0.67. The polymer had an intrinsic viscosity of 0.44 dl./g. when measured in phenol/trichloroethane, and a Tg=235° C.

The corresponding polymer prepared without F6DA has a Tg of 217° C.

EXAMPLE 2

A polyetherimide was prepared in accordance with the procedure of Example 1, except as noted hereafter. The reactants and solvents were 6.25 grams (0.012 mole) BPA DA, 10.66 grams (0.024 mole) F6DA, 3.89 grams (0.036 mole) m-phenylene diamine, 0.04 grams (0.0003 mole) of phthalic anhydride, 100 g. of m-cresol, and 100 ml. of toluene. The polyetherimide precipitate was dried at 180° C. under vacuum yielding a polyetherimide containing structuring units of A and B, respectively, of the formula

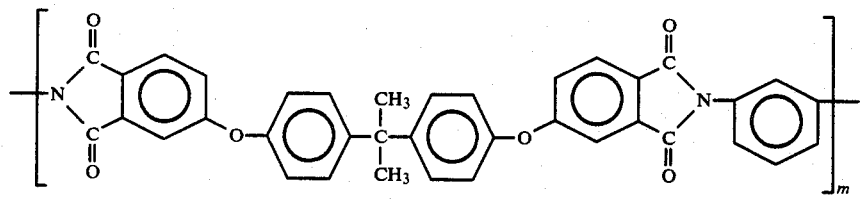

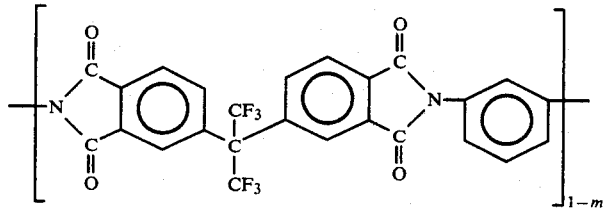

where m is a number equal to about 0.33. The polymer had an intrinsic viscosity of 0.38 dl./g. when measured in phenol/trichloroethane, and a Tg=257° C.

EXAMPLE 3

A polyetherimide was prepared in accordance with the procedure of Example 1, except as noted hereafter. The reactants and solvents were 5.20 grams (0.010 mole) BPA DA, 2.22 grams (0.005 mole) F6DA, 1.62 grams (0.015 mole) p-phenylenediamine, 0.03 grams (0.0002 mole) of phthalic anhydride, 100 g. of m-cresol and 150 ml. of toluene. The polyetherimide precipitate was dried at 180° C. under vacuum to give a polyetherimide containing structuring units A and B, respectively, of the formula

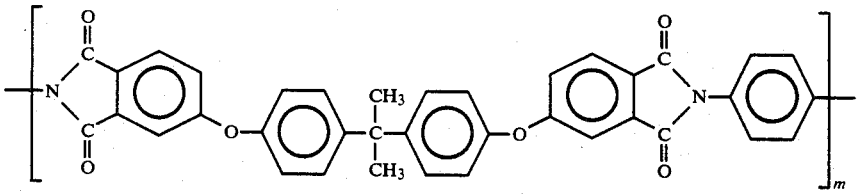

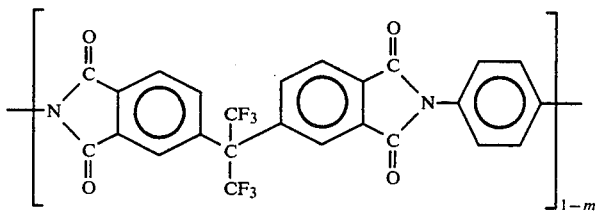

where m is a number equal to about 0.67. The polymer had an intrinsic viscosity of 0.46 dl./g. when measured in phenol/trichloroethane, and a Tg=252° C.

EXAMPLE 4

A polyetherimide was prepared in accordance with the procedure of Example 1, except as hereafter noted. The reactants and solvents were 3.64 grams (0.007 mole) BPA DA, 3.11 grams (0.007 mole) F6DA, 2.80 grams (0.014 mole) oxy-dianiline, 0.03 grams (0.0002 mole) of phthalic anhydride, 100 g. of m-cresol, and 150 ml. of toluene to give a polyetherimide containing structuring units A and B, respectively, of the formula

EXAMPLE 5

A polyetherimide was prepared in accordance with the procedure of Example 1, except as noted hereafter. The reactants and solvents were 4.16 grams (0.008 mole) BPA DA, 3.55 grams (0.008 mole) F6DA, 3.17 grams (0.016 mole) methyl dianiline (MDA), 0.03 grams (0.0002 mole) of phthalic anhydride, 100 g. of m-cresol, and 150 ml. of toluene to give a polyetherimide containing structuring units A and B, respectively, of the formula

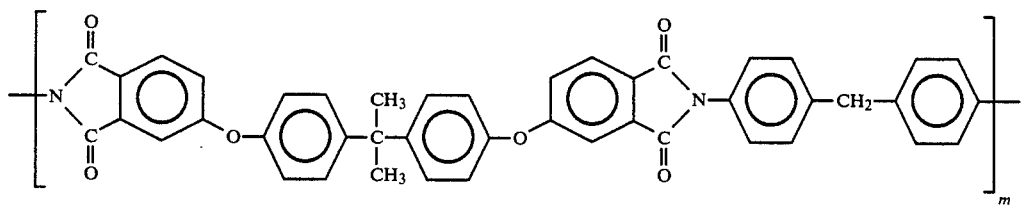

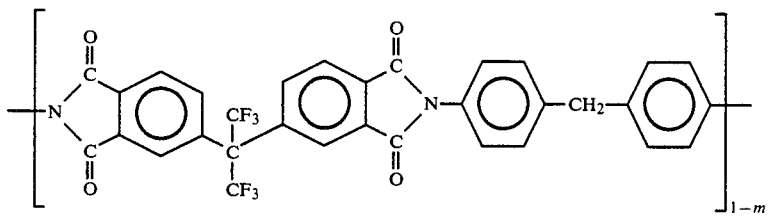

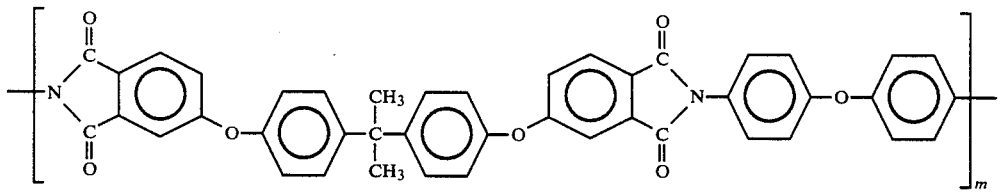

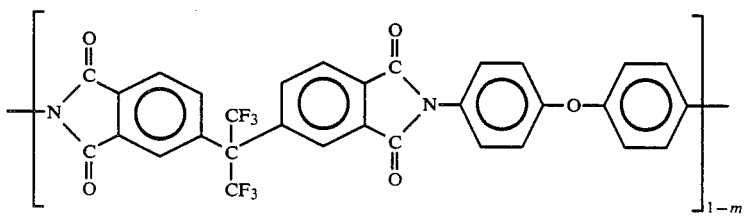

where m is a number equal to about 0.50. The polymer had an intrinsic viscosity of 0.39 dl./g. when measured in phenol/trichloroethane, and a Tg=238° C.

The corresponding polymer prepared without F6DA has a Tg of 210° C.

where m is a number equal to about 0.50. The polymer had an intrinsic viscosity of 0.37 dl./g. when measured in phenol/trichloroethane, and a Tg=241° C.

The corresponding polymer prepared without F6DA has a Tg of 210° C.

It will, of course, be apparent to those skilled in the art that other organic diamines—in addition to the organic diamines employed in the foregoing examples—of Formula VII can be employed without departing from the scope of this invention.

In addition to having the structuring units A represented by Formula II, the PEI polymers of this invention can also contain other A units, for instance, those of formula

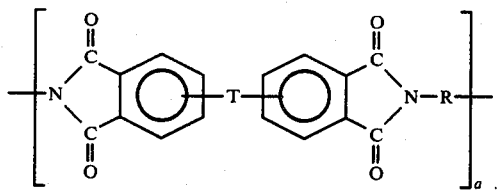

where T may be in the 3 or 3'- and 4 or 4'-positions and is a radical selected from the class consisting of (1)

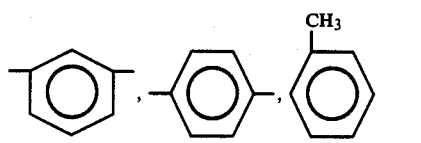

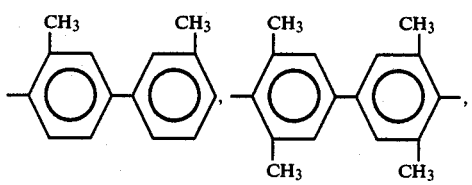

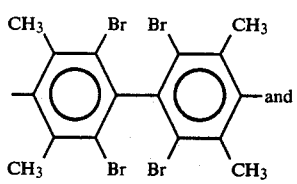

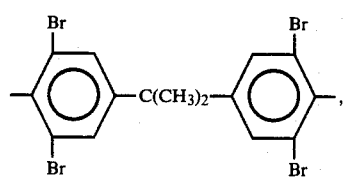

and (2) divalent organic radicals of the general formula

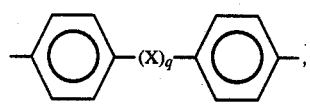

where X is a member selected from the class consisting of divalent radicals of the formulas $-C_xH_{2x}-$

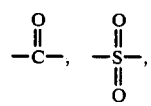

—O— and —S—, where R, a, q and y are as previously defined.

The compositions of the present invention have application in a wide variety of physical shapes and form, including the use as films, molding compounds, coatings, etc. When used as films or when made into molded products, these polymers, including laminated products prepared therefrom, not only possess good physical properties at room temperature but they retain their strength and excellent response to work-loading at elevated temperatures for long periods of time. Films formed from the polymeric compositions of this invention may be used in application where films have been used previously. Thus, the compositions of the present invention can be used in automobile and aviation applications for decorative and protective purposes, and as high temperature electrical insulation for motor slot liners, in transformers, as dielectric capacitors, as coil and cable wrappings (form wound coil insulation for motors), for containers and container linings, in laminating structures where films of the present composition or where solutions of the claimed compositions of matter are applied to various heat-resistant or other type of materials such as asbestos, mica, glass fiber and the like and superposing the sheets one upon the other and thereafter subjecting them to elevated temperatures and pressures to effect flow and cure of the resinous binder to yield cohesive laminated structures. Films made from these compositions of matter can also serve in printed circuit applications.

Alternatively, solutions of the compositions herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoro-ethylene, etc. The use of the curable compositions of the present invention as overcoats on other types of insulation is not precluded.

Applications which recommended these resins include their use as binders for asbestos fibers, carbon fibers, and other fibrous materials in making brake linings. In addition, molding compositions and molded articles may be formed from the polymeric compositions in this invention by incorporating such fillers as asbestos, glass fibers, talc, quartz, powder, wood flour, finely divided carbon, silica, into such compositions prior to molding. Shaped articles are formed under heat, or under heat and pressure in accordance with practices well known in the art. In addition, various heat-resistant pigments and dyes may be incorporated as well as various types of inhibitors depending on the application intended.

All of the foregoing patents and/or publications are incorporated herein by reference. Obviously, other modifications and variations of the present invention are possible in light of the above teachings. It is therefore, to be understood that changes may be made in the particular embodiments of the invention described which are within the full intended scope of the invention as defined by the appended claims.

I claim:

1. A polyetherimide of the formula $[A]_m[B]_{1-m}$ where m is a number greater than 0 and smaller than 1, where A units are of the formula:

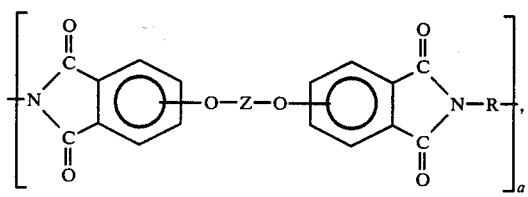

where —O—Z—O— is in the 3 or 3'- and 4 or 4'- positions and Z is a member of the class consisting of (1)

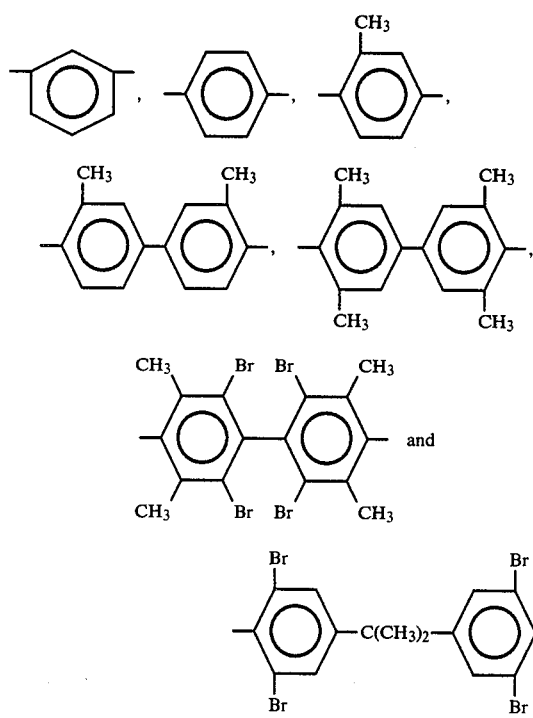

and (2) divalent organic radicals of the general formula:

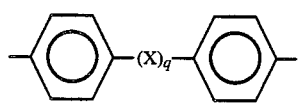

where X is a member selected from the class consisting of divalent radicals of the formulas, $C_yH_{2y}$,

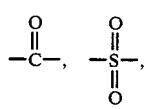

—O— and —S—, where q is 0 or 1, y is a whole number from 1 to 5, R is a divalent organic radical selected from the class consisting of (a) aromatic hydrocarbon radicals having from 6-20 carbon atoms and halogenated derivatives thereof, (b) alkylene radicals and cycloalkylene radicals having from 2-20 carbon atoms, $C_{(2-8)}$ alkylene terminated polydiorganosiloxane, and (c) divalent radicals included by the formula

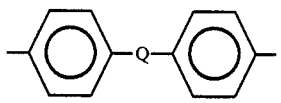

where Q is a member selected from the class consisting of —O—,

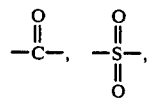

—S—, and —$C_xH_{2x}$—, and x is a whole number from 1 to 5 inclusive, and where the B units are of the formula:

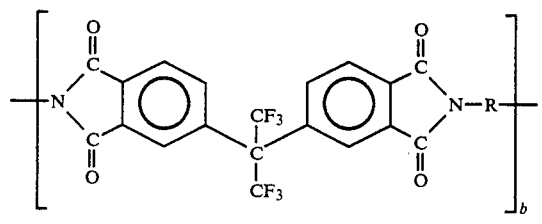

where R is a divalent organic radical as previously defined, and independently a and b represent a whole number in excess of 1.

2. A polyetherimide as defined in claim 1 wherein A is of the formula

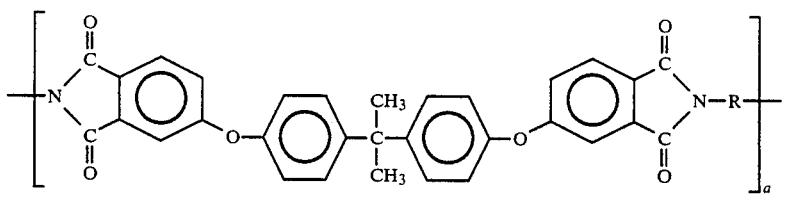

and R is a divalent organic radical as defined therein.

3. A polyetherimide as defined in claim 2 wherein R comprises

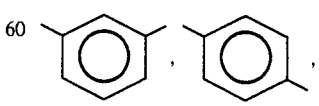

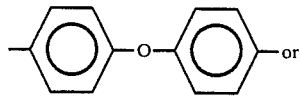 or

-continued

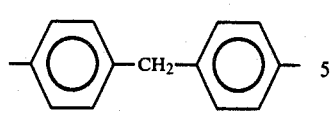

4. A polyetherimide as defined in claim 1 wherein m is from about 0.25 to about 0.75.

5. A polyetherimide as defined in claim 1 wherein m is about 0.67, Z is

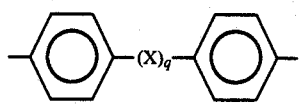

wherein q is 1 and X is —$C_3H_6$—; and R is

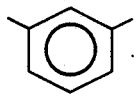

6. A polyetherimide as defined in claim 1 wherein m is about 0.33, Z is

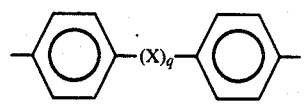

wherein q is 1 and X is —$C_3H_6$—; and R is

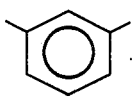

7. A polyetherimide as defined in claim 1 wherein m is about 0.67, Z is

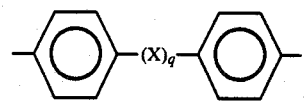

wherein q is 1 and X is —$C_3H_6$—; and R is

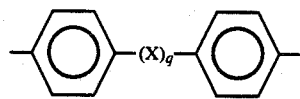

8. A polyetherimide as defined in claim 1 wherein m is about 0.50, and Z is

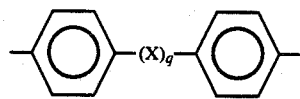

wherein q is 1 and X is —$C_3H_6$—; and R is

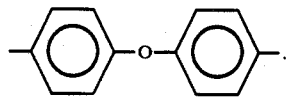

9. A polyetherimide as defined in claim 1 wherein m is about 0.50; and Z is

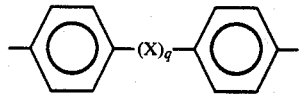

wherein q is 1 and X is —$C_3H_6$—; and R is

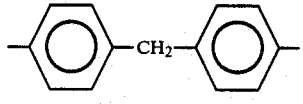

10. A composition adapted for use as a coating composition comprising a solution of
(i) a polyetherimide as defined in claim 1, and
(ii) a halogenated hydrocarbon solvent.

* * * * *